March 17, 1970  L. G. SIMJIAN  3,501,744
POSTAGE METERING SYSTEM HAVING SIGNAL CONDITIONING MEANS
Filed Nov. 15, 1967  3 Sheets-Sheet 1
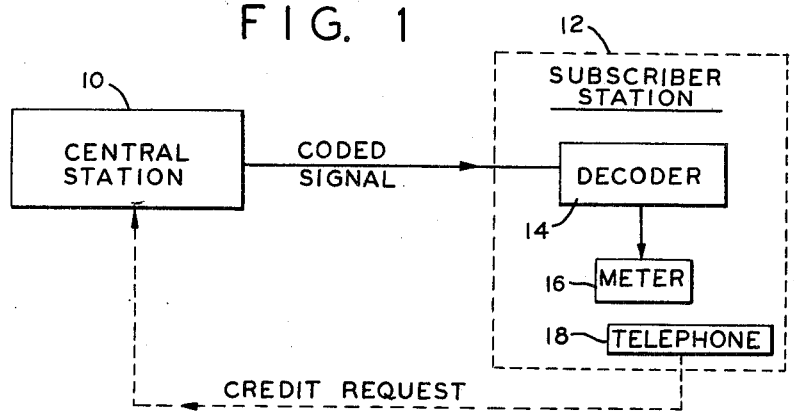
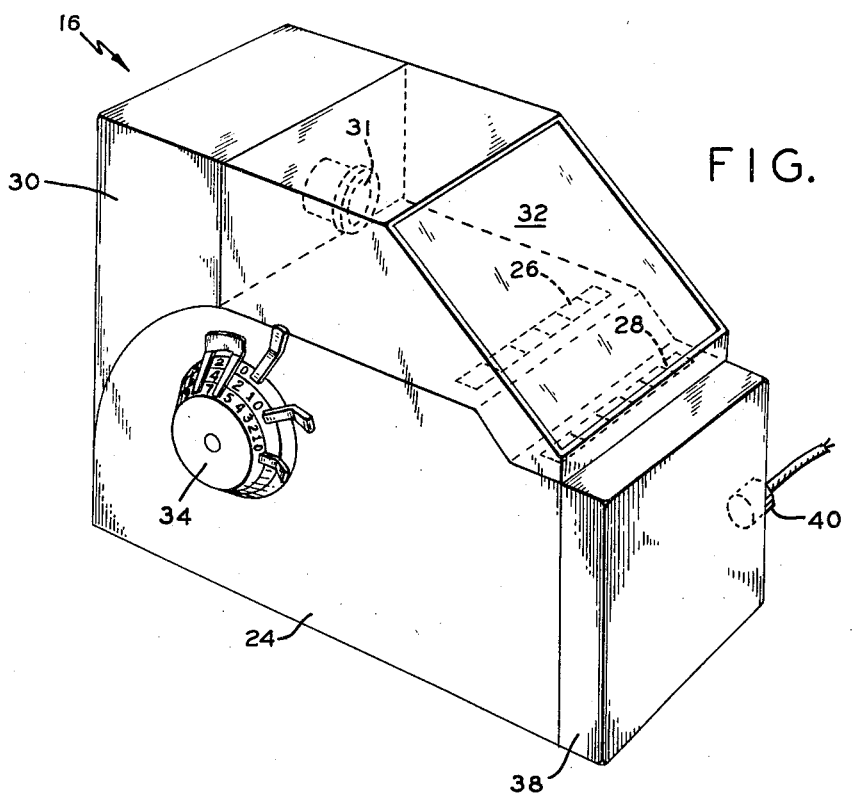
Luther G. Simjian
INVENTOR.
BY:
AGENT.

Luther G. Simjian
INVENTOR.

BY:

AGENT.

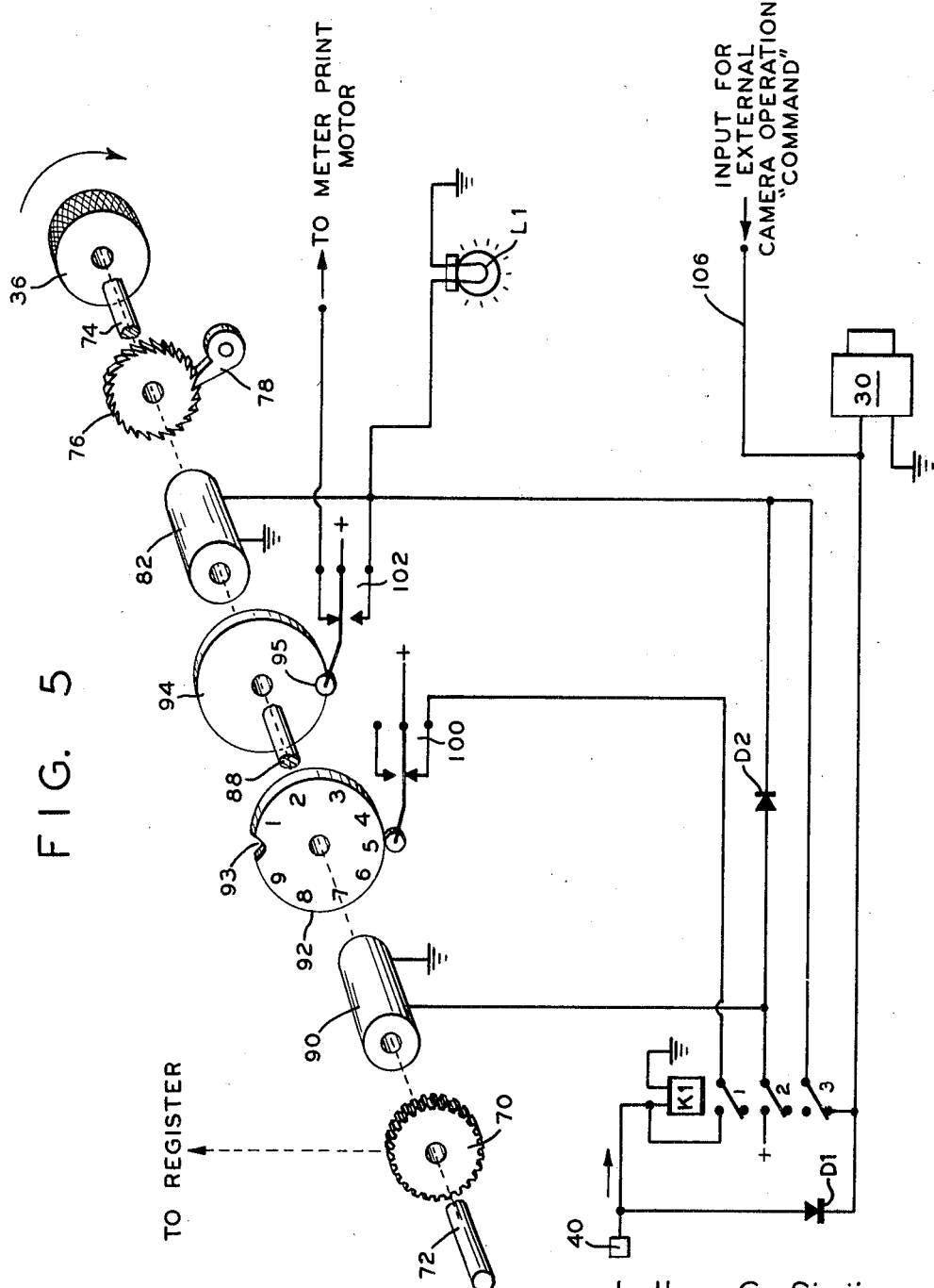

United States Patent Office

3,501,744
Patented Mar. 17, 1970

1

3,501,744
POSTAGE METERING SYSTEM HAVING SIGNAL CONDITIONING MEANS
Luther G. Simjian, Greenwich, Conn., assignor to General Research, Inc., Greenwich, Conn., a corporation of Connecticut
Filed Nov. 15, 1967, Ser. No. 683,287
Int. Cl. H04q 9/00; G06f 7/46; H04m 11/00
U.S. Cl. 340—152                                      20 Claims

ABSTRACT OF THE DISCLOSURE

In a postage metering system the postage meter disposed at a user station is provided with settable means for enabling the credit register of the meter to be set to reflect an increased credit balance. These settable means are normally in an inoperative condition, but are rendered operative for setting the register to reflect a predetermined increment in response to the receipt of a coded electrical signal originating at a remote central station. For record purposes the meter is provided with image recording means to furnish a record of counters indicating the monetary status of the register.

This application is related to my co-pending application for U.S. Letters Patent Ser. No. 513,322 entitled, "Postage Metering System," filed Dec. 13, 1965 and to my previously issued Patent No. 3,255,439 entitled, "Postage Metering System," dated June 7, 1966.

In the patent issued and in the co-pending application for U.S. Letters Patent, I have disclosed certain arrangements wherein a postage metering apparatus is adapted to affix indicia, representative of monetary value, to pieces of mail while an account of dispensed postage is maintained at a central station which may be located quite remote from the postage metering apparatus. In the references cited, a data link provides connection between the central station and the postage meter located at the subscriber station, and the central station issues a certain amount of credit against which the postage meter is permitted to issue postage. When the credit made available is exhausted, the postage meter becomes inopeartive and signalling means may be ued to notify the central station that a further sum of money must be made available to the subscriber station for rendering the postage meter operative. In the still pending application, particular means are described for setting the credit register forming an integral part of the postage meter to an increased credit balance responsive to the transmission of an electric signal.

The instant application for Letters Patent concerns a slightly different arrangement wherein an electric signal transmitted from the central station to the subscriber station conditions the postage meter in such a way that the register of the postage meter can be set to reflect an increased credit balance, the amount of increase being predetermined by adjustable means. More specifically, the postage meter disposed at a subscriber station is provided with reset means for changing the credit register by local manipulation to a value which represents an increased amount, such means being normally inoperative, but being rendered operative upon recipt of a suitable control signal from the central station. Upon setting the meter to the new value, the means providing such adjustment are rendered inoperative once again, pending the receipt of a subsequent signal from the central station.

One of the important objects of this invention is, therefore, the provision of a novel postage metering system.

Another important object of this invention is the provision of a postage meter which is controlled from a central station with respect to the credit available for issuing postage.

2

A further object of this invention is the provision of a postage meter disposed at a subscriber station which is adapted to receive a signal from a central station, such signal permitting the meter to be set to a new and increased credit balance.

A further important object of this invention is the provision of a postage meter adapted to be coupled to a central station for receiving coded signals, each signal denoting the issuance of a predetermined amount of credit to the particular meter.

A still further object of this invention is the provision of a postage meter which does not require to be set to an increased credit balance at a prescribed location, such as a Post Office, but which meter can be set locally at the subscriber station to reflect an increased credit balance while proper safeguards are present to maintain full control over the total amount of postage available for dispensation.

Further and still other objects of this invention will be more clearly apparent by reference to the following description when taken in conjunction with the accompanying drawings, in which:

FIGURE 1 is a schematic, block diagram of the novel postage metering system;

FIGURE 2 is a perspective view of the modified postage meter;

FIGURE 5 is an electrical circuit diagram including an exploded view of certain mechanical parts for explaining the activation and de-activation of the register setting means.

Figure 3:
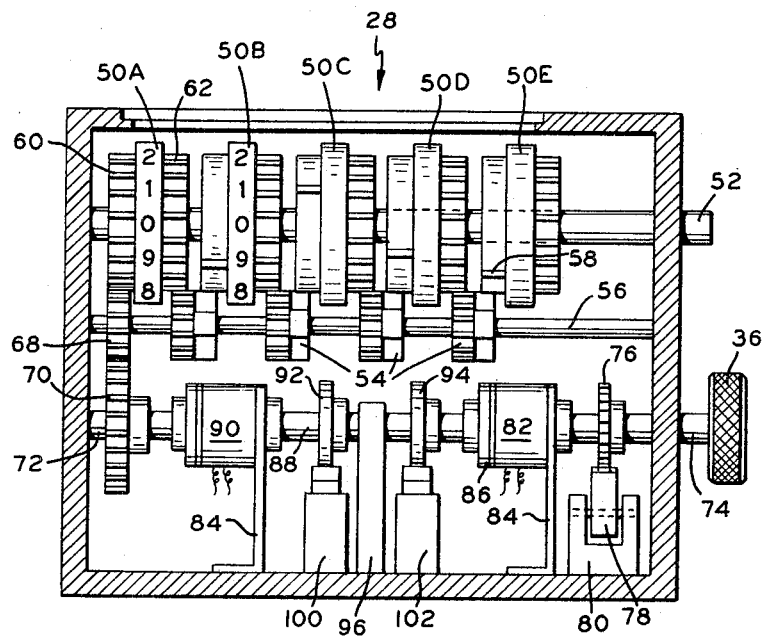
FIGURE 3 is a front, elevational view, partly in section, showing certain portions of the credit register of the postage meter of FIGURE 2.

Referring now to the figures and FIGURE 1 in particular, there is shown in block form a central station 10 which is adapted to provide upon demand a coded electrical signal to a subscriber station 12. Apparatus for providing coded electrical signals are well known and the particular type and method of coding the signal so as to provide a desired degree of security does not form a part of this invention. The data link between the station 10 and the subscriber station 12 may be a wired or wireless connection. The coded signal reaches a decoding unit 14 and, if the signal is of the proper type, it is passed to a postage meter 16 which includes certain control means as will be explained later. The postage meter 16 is under the control of a local operator and is adapted to dispense various amounts of postage by imprinting indicia in the conventional manner. When the credit provided in the postage meter is exhausted and operation of the meter is blocked in the conventional manner, an operator may use a telephone 18 to send a credit request to the central station and, if certain conditions are met, the central station will send once again a signal to the subscriber station 12. Upon receipt of such a signal, a reset means which forms a part of the meter 16 and permits the credit register to be set to reflect an increased credit balance is unlocked, that is changed from its normally inoperative condition to its normally operative condition, and the register can be reset either manually or automatically to reflect the credit issued by the central station. Simultaneously with the transmission of the signal from the central station 10 to the subscriber station 12 a record of the issuance of credit may be made at the central station, either automatically or manually, and suitable billing can be effected in the normal course of business.

FIGURE 2 is a view of the postage meter employed in connection with the present arrangement. The meter, provided with certain modifications for the present purpose, is basically a commercial unit, such as the Postalia Postage Meter, model KF 1501, available from the Postalia Division of the Tele-Norm Corporation, 32—31 57th Street, Woodside, New York, N.Y. 11377. The meter 16 is enclosed in a housing 24 from which extends a postage setting mechanism 34 for adjusting the monetary value of the postage indicia to be imprinted. Each of the three settable levers may be set from digits between 0 to 9 for adjusting respectively the cent, ten cent, and dollar amounts of the postage. The meter is provided, furthermore, with an ascending counter 26 and a descending counter 28 both of which are coupled to the credit register to indicate respectively the total amount of postage dispensed since a particular reset date and the amount of credit remaining in the register. It will be understood that the indicia displayed by both counters change in response to the individual postage imprinting operation to reflect always the current credit condition. In order to provide a record of the condition of the postage meter, either upon command for audit purposes, or at the time the meter is being reset to reflect an increased credit balance, the postage meter is provided with an electrically operated image recording means 30 having lens means 31 and disposed to view the indicia displayed by both counters 26 and 28 by means of an inclined partially reflecting mirror 32. The mirror surface 32 is so disposed and arranged that, aside from reflecting an image from the counters to the lens means 31, the indicia of the counters are visible also to a person looking at the counters from the top or front of the meter.

In addition the postage meter 16 is provided also in the present embodiment with a knob 36, not visible in FIGURE 2 but shown in FIGURES 3 and 5. This knob serves for the puropse of setting the credit register of the postage meter to reflect an increased credit balance and is located on the right side of the postage meter in association with the counter 28. The knob 36 is normally inoperative and its co-action with the register and the postage meter will be described later. Finally, a front portion 38 contains various electrical circuit elements for controlling the register in response to the signal from the central station, and a connector 40 is provided by which the signal from the decoder 14 is applied to the postage meter. It will be understood that the camera 30 is one which is triggered electrically for opening and closing the lens shutter and includes also means for automatic film winding. Cameras of this type are commercially available and need not be described further.

FIGURE 3 is an elevational view, partly in section, of the credit register forming a part of the postage meter, the front portion 38, FIGURE 2, having been removed. The view shows the descending numerical counter 28 (FIGURE 2) and its associated wheels and credit entering or setting mechanism. A set of five register wheels is shown. The wheels are 50A, 50B, 50C, 50D and 50E, repersenting a maximum amount of $999.99. It will be apparent that the quantity of wheels may be varied to accommodate other orders of credit. As described for the purpose of the present invention, the credit made available will be increased by units of one hundred dollars and, therefore, it will be necessary to obtain rotation of the counter wheel 50A. The five register wheels are mounted on a common shaft 52. A set of Geneva wheels 54 is located below the register wheels, on a shaft 56, and these Geneva wheels are meshed with the respective register wheels. A projection 58 causes the associated Geneva wheels to rotate in a manner as to cause the register to count downward from the input of the unit wheel 50E. This type of decade register is well known in the art and reference is made to various decade counters manufactured by the Veeder Root Company of Hartford, Conn., as well as to U.S. Patent 3,251,546 dated May 17, 1966, issued to S. J. Rigo et al. entitled, "Register Resetting Means," and to Canadian Patent No. 518,301 issued Nov. 8, 1955 to Francis J. Rouan entitled, "Register Wheel Setting Means." Both patents show credit registers for postage meters and disclose the details of a standard register in gerater detail.

The description hereafter is directed only to the novel feature for rendering the register settable by means, such as knob 36, to provide upon operation thereof an increased balance in the register. In the exemplary description, the credit is increased by a predetermined increment of one or several hundred dollars.

Figure 4:
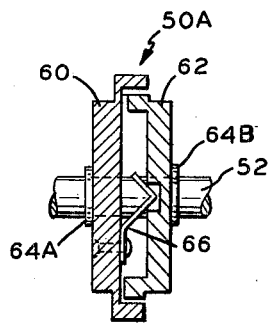
FIGURE 4 is a sectional view of certain details of the register.

The wheel 50A per FIGURE 3, denoting one hundred dollar units, is shown also in partial section in FIGURE 4 and depicts a two-part construction 60 and 62, both parts being mounted on shaft 52 and held thereon by annular snap rings 64a and 64b. The wheel portion 60 is releasably held to the opposing portion 62 by means of a formed spring 66 which rests in notches in the portion 62. As the wheel portion 62 is moved by movement of the associated Geneva wheel, the left wheel portion 60 which carries the visible numerals on its periphery is also advanced, but while the portion 62 is held in place by the Geneva wheel, the left-hand portion 60 can be rotated by an externally operated reset mechanism which will be described in greater detail.

Referring again to FIGURE 3, the hundred dollar wheel 50A and, more specifically, the left hand portion 60 is coupled via a gear 68 to a gear 70 which is mounted on a shaft 72. The previously mentioned knob 36 used when rendered operative for providing an increase in the credit balance in the register is mounted on a shaft 74 which also carries a ratchet 76 engaged by a pawl 78 which in turn is supported in a stationary block 80. The purpose of the ratchet is to assure that the shaft 74 can be rotated only in one direction. A clutch 82 is mounted on the left end of the shaft 74 and is supported by a bracket 84.

The clutch 82 is a two-part device, comprising an armature plate 86 and a magnetic coil. When de-energized, the armature and coil portions are free from one another and can rotate independently. When the coil is energized, the armature and the body are coupled together magnetically and rotational torque is transmitted through the clutch as is well known to those skilled in the art. An inner shaft 88 is positioned between and coupled to the clutches 82 and 90, the clutch 90 being identical to the clutch 82. Carried on the shaft 88 are two cams 92 and 94 which co-act with the arms of respective electrical switches 100 and 102.

FIGURE 5 is a schematic electrical circuit diagram involving the parts which form the present invention. An electrical signal from the central station 10 and suitably decoded by the decoder 14, if of proper code, reaches the control unit 38 via the connector 40. The signal causes operation of the relay K1 which then remains in the energized state through contact K1–1 and the closed switch 100. Energizing of the relay K1 closes also the associated contact K1–2, thereby causing power to be applied to both clutches 90 and 82 thus rendering the shafts 72, 88 and 74 effectively one single shaft. At the same time a lamp L–1 is illuminated, signalling that the register is ready for being reset to reflect an increased credit balance. The knob 36, serving as the resetting means, now can be turned by hand in the direction of the arrow and as it is turned the following occurrences take place:

(a) The gear 70, see also FIGURE 3, turns the register wheel 50A, thus increasing the credit register to the extent provided for by the co-action between the cam 92 and the associated switch 100.

(b) As the switch 100 is actuated by the notch 93 in the cam 92, the relay K1 is de-energized and the clutch 90 becomes de-energized also by the opening of contact K1–2. This terminates the coupling between the knob 36 and the gear 70 and therefore de-activates the register reset means.

(c) Continued turning of the knob 36 as indicated by the lamp L–1 accomplishes one full revolution and resets the cam 92 to its original position and as the switch arm associated with the switch 102 drops into the notch 95 of the cam 94, the clutch 82 is de-energized, and hence, although the knob 36 may be rotated still further, no mechanical rotation beyond the ratchet and pawl 76, 78 occurs. The resetting of the switch 102 reapplies power to the print mechanism meter motor found in the conventional postage meter.

Immediately after the credit register has been set and the relay K1 becomes de-energized, step (b) above, the voltage from the switch 102 through the contact K1–3 operates the shutter of the camera 30, thus providing a documentary record of the fact that the register has been set to reflect an increased credit balance. As explained previously, the image recording means is adapted to record the numerical values displayed by the ascending and descending counters. The initial signal pulse, adapted to operate the relay K1 for rendering the knob 36 operative, also is adapted to pulse the recording camera 30, thus providing a record of the counter settings at the beginning and at the end of the register manipulation. In addition, a provision has been made to operate the camera remotely at any time by means of a "command" pulse applied to the signal line 106. This feature is helpful when an audit is required which does not coincide with setting of the meter register.

The diodes D1 and D2 are circuit elements provided to prevent the applied voltages from feeding back and causing undesired operation.

As shown in FIGURE 5 the clutch 90 becomes de-energized when the notch 93 of the wheel 92 engages the switch arm located at the "5" position. Since the wheel 92 coacts with the one hundred dollar register wheel in the register, the register is increased by the sum of five hundred dollars. Assuming that only increases of one hundred dollars shall be effected at a particular subscriber station as determined by personnel at the central station, the wheel 92 will be rotated and set on the shaft 88 by authorized personnel in such a manner that the notch 93 occupies the shown "4" position and the arm of the switch 100 is then in contact with the wheel position identified "1". Therefore, the wheel can now be rotated only one-tenth of a revolution, until the switch arm associated with switch 100 drops into notch 93 and causes de-activation of the clutch 90. Similarly, if for instance increases of seven hundred dollars are to be effected, the wheel 92 is reset on the shaft so that the switch arm is in contact with the position represented by the numeral "7." The wheel or cam 92 will then rotate seven-tenths of a revolution. Thus, it is clearly apparent that the register includes means for providing it to be set to an increased balance reflecting a predetermined incremental sum of money and that this increment is adjustable.

As shown in FIGURE 5, the means for setting the register 36 is a knob which must be rotated clockwise. It is apparent that this mechanism may be replaced by a pivotable lever or a push-button mechanism adapted to translate linear motion to rotational motion. Additionally, while the knob 36 is illustrated for human manipulation, it may be coupled to or be replaced by a motor including a single revolution clutch for providing the setting action in the credit register.

Still further, it will be apparent to those skilled in the art that a subscriber station 12 may include a plurality of postage meter units 16 and that these meters may be selectively coupled to the decoding unit 14 for receiving a signal which changes the credit setting mechanism from its normally inoperative status to its operative condition. Upon setting the register to an increased balance, the setting mechanism then reverts to its normally inoperative status as described. Also, as shown in my Patent No. 3,255,039 supra, the central station is readily adapted to serve by means of individually coded signals a plurality of subscriber stations. For accounting purposes, every time that the subscriber station is provided with a suitably coded signal, manual means or computing means are used to debit the respective subscriber station with the predetermined amount of credit increment. The register of the meter, using the present arrangement, is sealed by authorized personnel and the subscriber station personnel has no access to the credit register. The only action subscriber station personnel is capable of performing is the operation of the setting means represented by the knob 36, and as explained, this knob in the absence of a signal from the central station is inoperative but can be rendered operative by a coded signal upon a request transmitted to the central station by means of voice or by other communication. After the predetermined amount of credit increment, the amount of which must be known to the central station, has been adjusted by the subscriber station personnel, the knob 36 is once again rendered inoperative. If the predetermined amount of credit increment is to be changed, it will be necessary for authorized personnel employed by the central station to break the seal and change the position of the wheel 92 on the shaft 88. Subsequently the register is sealed again. Thus the integrity of the credit register can be maintained as is shown for instance in the Canadian Patent supra. It should be noted further that each signal transmission from the central station permits the postage meter to be set by only a single credit increment.

In another embodiment, it will be apparent that the image recording means 30 may be replaced by a remote meter reading means, i.e. the status of the register may be transmitted by telephone wire to the central station in a manner similar to that employed with the remote reading of elecric power meters.

While there has been illustrated and described a preferred embodiment of my invention and several modifications have been indicated and explained, it will be apparent to those skilled in the art that various further changes and modifications may be made without departing from the principle and scope of my present invention.

What is claimed is:

1. In a postage metering system, the combination of: a subscriber station comprising a meter including an imprinting means for recurrently and selectively imprinting indicia representative of monetary value; control means coupled to said imprinting means for selectively adjusting the indicia to be imprinted by said meter; a credit register coupled to said meter and adapted to be set to a position responsive to the amount of credit balance present in said meter and being responsive to individual imprinting operations whereby said register is set to a position indicative of a reduced credit balance corresponding to the monetary value of the indicia imprinted by said imprinting means, the improvement comprising:
   means normally inoperative coupled to said register for setting said register to a setting representative of an increased credit balance, and
   further control means adapted to receive a signal coupled to said normally inoperative means and in response to the receipt of such signal causing said normally inoperative means to be rendered operative, whereby responsive to the operation of said latter means said register is set to a setting representative of an increased credit balance.

2. In a postage metering system, the combination of: a subscriber station comprising a meter including an imprinting means for recurrently and selectively imprinting indicia representative of monetary value; control means coupled to said imprinting means for selectively adjusting the indicia to be imprinted by said meter; a credit register coupled to said meter and adapted to be set to a position responsive to the amount of credit balance present in said meter and being responsive to individual imprinting operations whereby said register is set to a position indicative of a reduced credt balance corresponding to the monetary value of the indicia imprinted by said imprinting means, the improvement comprising:
   means for setting said register to an increased credit balance coupled to said meter and normally maintained in a first condition in which such setting is precluded, and further control means adapted to receive a signal coupled to said means for setting said register and in response to the receipt of such signal changing said means for setting from said first condition to a second condition in which responsive to the operation of said means for setting said register is set to an increased credit balance.

3. In a postage metering system as set forth in claim 2 wherein said further control means is adapted to receive an electrical signal.

4. In a postage metering system as set forth in claim 2, said further control means coupled to a means for being responsive to a coded electrical signal transmitted from a point outside said subscriber station.

5. In a postage metering system as set forth in claim 2, said means for setting said register being coupled to additional control means to cause in response to the operation of said means for setting said register to be set to an increased credit balance reflecting a predetermined increase.

6. In a postage metering system as set forth in claim 5 wherein said additional control means includes means to adjust said predetermined increase.

7. In a postage metering system as set forth in claim 6 wherein said means to adjust said predetermined increase is provided with indicia denoting certain increments of money.

8. In a postage metering system as set forth in claim 2 and including additional means coupled to said means for setting said register to an increased balance to cause, responsive to the operation of said means for setting, said latter means to be returned from its second condition to its first condition.

9. In a postage metering system as set forth in claim 2, said register including a counter displaying indicia indicative of the amount of creidt balance; an image recording means disposed to view said indicia, and means for actuating said recording means whereby to provide a record of the indicia.

10. In a postage metering system as set forth in claim 9, wherein said means for actuating said recording means is actuated in response to a change of condition of said means for setting.

11. In a postage metering system, the combination of:
a subscriber station comprising a meter including an imprinting indicia representative of monetary value; control means coupled to said imprinting means for selectively adjusting the indicia to be imprinted by said meter; a credit register including a counter displaying indicia coupled to said meter and adapted to be set to a position responsive to the amount of credit balance present in said meter and being responsive to individual imprinting operations whereby said register and counter are set to a position indicative of a reduced credit balance corresponding to the mometary value of the indicia imprinted by said imprinting means, a second counter coupled to said register and displaying indicia for indicating the total monetary value of the indicia imprinted by said imprinting means since a previous setting of said second counter; the improvement comprising:

means for setting said register by a preset increment to an increased credit balance coupled to said register and normally maintained in a first condition in which the setting of said register to reflect such increment is precluded;

further control means responsive to an electrical signal coupled to said means for setting and in response to the receipt of such signal changing said means for setting from said first condition to a second condition in which said register, responsive to the operation of said means for setting, is set to an increased credit balance reflecting said increment, and additional means coupled to said means for setting for causing, responsive to said increased credit balance being reached, said means for setting to be returned from its second condition to its first condition.

12. In a postage metering system as set forth in claim 11 and including means for varying the monetary value of said preset increment.

13. In a postage metering system as set forth in claim 12, said means for varying the monetary value of said increment comprising a cam whose rotational position is adjustable.

14. In a postage metering system as set forth in claim 11, said further control means being responsive to a coded electrical signal.

15. In a postage metering system as set forth in claim 11 and including signalling means coupled for indicating that said means for seting has been changed from its first to its second condition.

16. In a postage metering system as set forth in claim 11 and including image recording means disposed to view said counters for providing when a actuated a record of the indicia displayed.

17. In a postage metering system as set forth in claim 16 and including a means for actuating said image recording means responsive to the condition of said means for setting being changed.

18. In a postage metering system as set forth in claim 11, said credit register including a plurality of counter wheels and said means for setting being adapted to rotate one of said counter wheels.

19. In a postage metering system as set forth in claim 11, said further control means including a clutch means whose activation determines the condition of said means for setting said register.

20. In a postage metering system, the combination of:
a subscriber station comprising a meter including an imprinting means for recurrently and selectively imprinting indicia representative of momentary value; control means coupled to said imprinting means for selectively adjusting the indicia to be imprinted by said meter; a credit register including a plurality of counter wheels displaying indicia coupled to said meter and adapted to be set to a position responsive to the amount of credit balance present in said meter and being responsive to individual imprinting operations whereby said register and counter wheels are set to a position indicative of a reduced credit balance corresponding to the monetary value of the indicia imprinted by said imprinting means, a second set of counter wheels coupled to said register and displaying indicia for indicating the total monetary value of the indicia imprinted by said imprinting means since a previous setting thereof; the improvement comprising:

rotatable means for setting said register by a preset increment to an increased credit balance coupled to said register and normally maintained in a first condition in which the setting of said register to reflect such increment is precluded;

further control means responsive to an electrical signal and including a clutch coupled to said rotatable means whereby said clutch, responsive to the receipt of such signal, is energized, thereby changing said means for setting from its first condition to a second condition in which said register, responsive to the operation of said rotatable means, is set to an increased credit balance reflecting said increment;

additional means coupled to said means for setting for causing, responsive to said increased credit balance being reached, said means for setting to be returned from its second condition to its first condition;

means coupled to said control means and said additional means for adjusting the monetary value of said preset increment;

an image recording means disposed to view the indicia displayed by said counters;

control means coupled to said image recording means for causing actuation of said recording means whereby to provide a record of the indicia displayed by said counters, and a remote central station including transmission means for sending said electrical signal to said subscriber station for receipt by said further control means.

References Cited

UNITED STATES PATENTS 3,221,934  12/1965  Klaffky.

DONALD J. YUSKO, Primary Examiner

U.S. Cl. X.R.

179—2